(12) United States Patent
Hart et al.

(10) Patent No.: US 11,511,514 B2
(45) Date of Patent: Nov. 29, 2022

(54) MODULAR POLYVINYL CHLORIDE RETROREFLECTIVE IDENTIFICATION SYSTEM

(71) Applicant: Tier 1 Transnational LLC, Houston, TX (US)

(72) Inventors: Christopher J Hart, Waco, TX (US); Trey Stach, Waco, TX (US); Colleen Hart, Waco, TX (US)

(73) Assignee: TIER 1 TRANSNATIONAL LLC, Houston, TX (US)

( * ) Notice: Subject to any disclaimer, the term of this patent is extended or adjusted under 35 U.S.C. 154(b) by 0 days.

(21) Appl. No.: 16/733,120

(22) Filed: Jan. 2, 2020

(65) Prior Publication Data
US 2020/0215792 A1 Jul. 9, 2020

Related U.S. Application Data

(60) Provisional application No. 62/787,893, filed on Jan. 3, 2019.

(51) Int. Cl.
*B32B 7/08* (2019.01)
*B32B 7/023* (2019.01)
*B32B 27/30* (2006.01)

(52) U.S. Cl.
CPC .............. *B32B 7/023* (2019.01); *B32B 7/08* (2013.01); *B32B 27/304* (2013.01);
(Continued)

(58) Field of Classification Search
CPC . B32B 1/00; B32B 2305/347; B32B 2307/41; B32B 2307/416; B32B 2307/422; B32B 27/304; B32B 7/023; B32B 7/08
See application file for complete search history.

(56) References Cited

U.S. PATENT DOCUMENTS

| 6,191,200 B1 * | 2/2001 | Phillips | B32B 27/18 |
| | | | 524/102 |
| 2018/0339251 A1* | 11/2018 | Li | B01D 39/18 |

FOREIGN PATENT DOCUMENTS

WO 2007/126965 8/2007

OTHER PUBLICATIONS

Patch Panel; "Custom Patches"; webpage under menu item "Custom Patches"; accessed at "https://patchpanel.ca/pages/new-custom-patches" on Jan. 24, 2022 (3 pages).
(Continued)

*Primary Examiner* — Lawrence D Ferguson
(74) *Attorney, Agent, or Firm* — Trop, Pruner & Hu, P.C.

(57) ABSTRACT

A multi-layer identification patch includes a reflective background layer comprising a front side to face away from a garment when the multi-layer identification patch is affixed to the garment, and a mask layer secured over the front side of the reflective background layer. The mask layer comprises (a) an opaque layer of flexible polyvinyl chloride (PVC) and (b) a void in the opaque layer of flexible PVC. The void has a shape that forms an identification symbol. The opaque layer of flexible PVC is secured over a first portion of the reflective background layer, thereby fixing the void that forms the identification symbol over a second portion of the reflective background layer, and thereby enabling the second portion of the reflective background layer to reflect light through the void in the shape of the identification symbol. Other embodiments are described and claimed.

10 Claims, 6 Drawing Sheets

(52) U.S. Cl.
CPC ..... *B32B 2305/347* (2013.01); *B32B 2307/41* (2013.01); *B32B 2307/416* (2013.01); *B32B 2307/422* (2013.01)

(56) References Cited

OTHER PUBLICATIONS

Patch Panel; webpage under menu item "PATCHES/CUSTOMIZABLE"; accessed at "https://patchpanel.ca/pages/new-custom-patches" on Jan. 24, 2022 (26 pages).
Patch Panel; webpage accessed at "https://patchpanel.ca/pages/custom-patches" on Jan. 25, 2022 (3 pages).
Patch Panel; "6" X 2" ID Panel With HI VIS Flag"; webpage under menu item "PATCHES/CUSTOMIZABLE"; accessed at "https://patchpanel.ca/collections/customizable/products/6-x-2-id-panel-with-hi-vis-flag" on Jan. 24, 2022 (4 pages).
Daniel P.; online review of Patch Panel product at "https://patchpanel.ca/collections/customizable/products/4-x-1-custom-name-tape"; dated Aug. 3, 2018; accessed on Jan. 21, 2022 (1 page).
Larry W.; online review of Patch Panel product at "https://patchpanel.ca/collections/flags/products/micro-united-states-flag-hiviz"; dated Feb. 27, 2019; accessed on Jan. 24, 2022 (1 page).
Taylor L.; online review of Patch Panel product at "https://patchpanel.ca/collections/customizable/products/4-x-1-custom-name-tape"; dated Jul. 10, 2018; accessed on Jan. 21, 2022; 1 page.
Daniel M.; online review of Patch Panel product at https://patchpanel.ca/collections/customizable/products/4-x-1-custom-name-tape; dated Sep. 18, 2019; accessed on Jan. 24, 2022; 1 page.

\* cited by examiner

MODULAR POLYVINYL CHLORIDE RETROREFLECTIVE IDENTIFICATION SYSTEM

STATEMENT OF PROVISIONAL APPLICATION

This application claims the benefit of priority to U.S. Provisional Application No. 62/787,893 filed on Jan. 3, 2019, the entire contents of which are hereby incorporated by reference.

BACKGROUND

Field

The present disclosure relates generally to military, law enforcement, and first responder accessories. More particularly, to advance multi-layered systems for identification.

Background

Positive identification of operational personnel and targets, as well as distinguishing between the two, is a major safety concern for tactical professionals. Tactical professionals monitoring on high alert may end in misidentification causing death and damage with negative psychological and social impacts, so specialized equipment and technologies designed to facilitate positive identification are needed to mitigate risks for professionals working within especially hazardous industries.

The identification of friend or foe is vastly important in both the military and law enforcement communities. Identification similarly aids first responders. While reflective gear and equipment is widely used in these sectors, identification markings are severely lacking with respect to modern technological development. For personnel, badges and patches have widely been used since the 1800s, but the standard has also not significantly changed, despite improvement being necessary.

There are multiple disadvantages to existing technologies available to law enforcement and military personnel. Traditional reflective markers available on the market for visibility allow for the detection of one type of light only: infrared reflective or reflective.

Conventional reflective devices includes patches with identification features that are applied either by screen printing ink on top of a reflective substrate or by sewing fabric on top of a reflective substrate. The fabric may be shaped like a stencil, with holes or gaps in the shape of letters to expose portions of the reflective substrate. However, screen printed ink and fabric stencils are both relatively features on gear (e.g., features made from reflective tape) may be frail, and when they are exposed to the elements under combat conditions, they generally may fall apart, fade and lose utility over short periods of use.

Were there a design modification for a system or method of identification which would alleviate, not only the lack of visibility, but increase functional life span of the identification systems, it would be of tremendous benefit to both communities and the world at large.

No one has to-date proposed such a design.

SUMMARY

In view of the foregoing, the present inventor here discloses such an improved system.

The present inventor here discloses an improved system, with design features for improved identification of a long-lasting nature for less stressful and safer combat operations.

Embodiments of polyvinyl chloride (PVC) protected retroreflective based identification (PVC-RR-ID) systems of the present disclosure solve several problems that exist with the current available options. First such PVC-RR-ID systems are made to allow identification in multiple types of light, rather than just light in the infrared spectrum, or high visibility in normal visible light. Additionally, the PVC protective layer has a much greater degree of durability in all weather conditions. Furthermore, as opposed to traditional uniform markers, PVC offers the ability to have enhanced design detail which is useful for both military and law enforcement communities where the positive identification of operational personnel is a major safety concern. Such PVC-RR-ID systems further provide a platform that can be equipped with additional features that allow for even greater utility for the user.

PVC-RR-ID systems greatly increase officer/military personnel safety because it is easier to see personnel in ambient light with or without the use of special night vision equipment. The ability to customize the face front of the product with greater detail than that of embroidered counterparts also helps the public identify, in clearer definition and due in part to a higher degree of reflectivity, safety personnel in emergency situations or public safety officials in routine situations.

Greater benefits are thus produced, overcoming being on stressful high alert at all times with constant monitoring, which is exhausting, and eliminating misidentification leading to negative psychological and social impacts.

DETAILED DESCRIPTION OF THE PREFERRED EMBODIMENT

Figure 1:
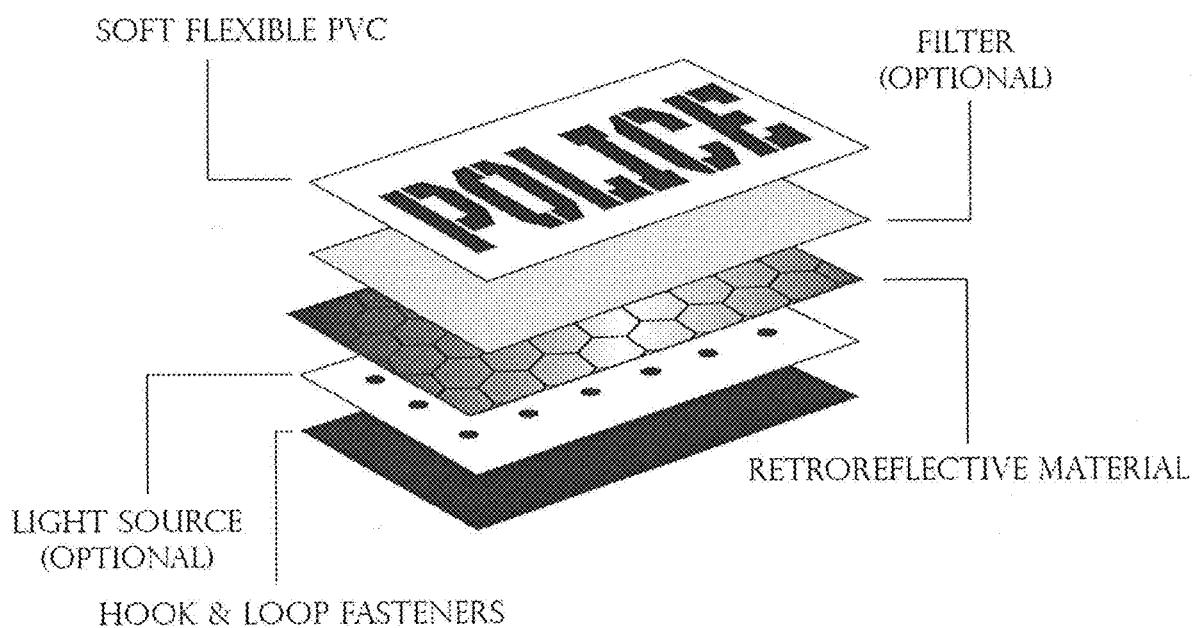
FIG. 1 is the break-down of a representative multi-layer PVC-RR-ID system.
Figure 2:
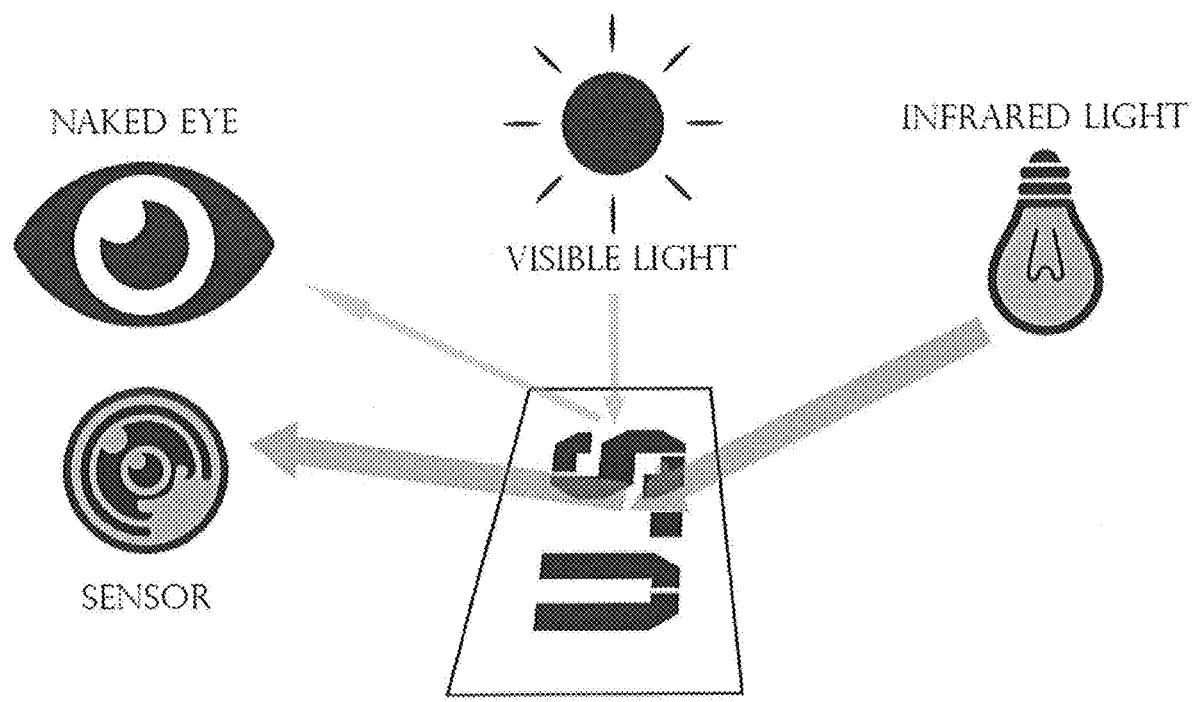
FIG. 2 is a perspective of an embodiment for visible light and infrared (IR) light reflecting off the product.
Figure 3:
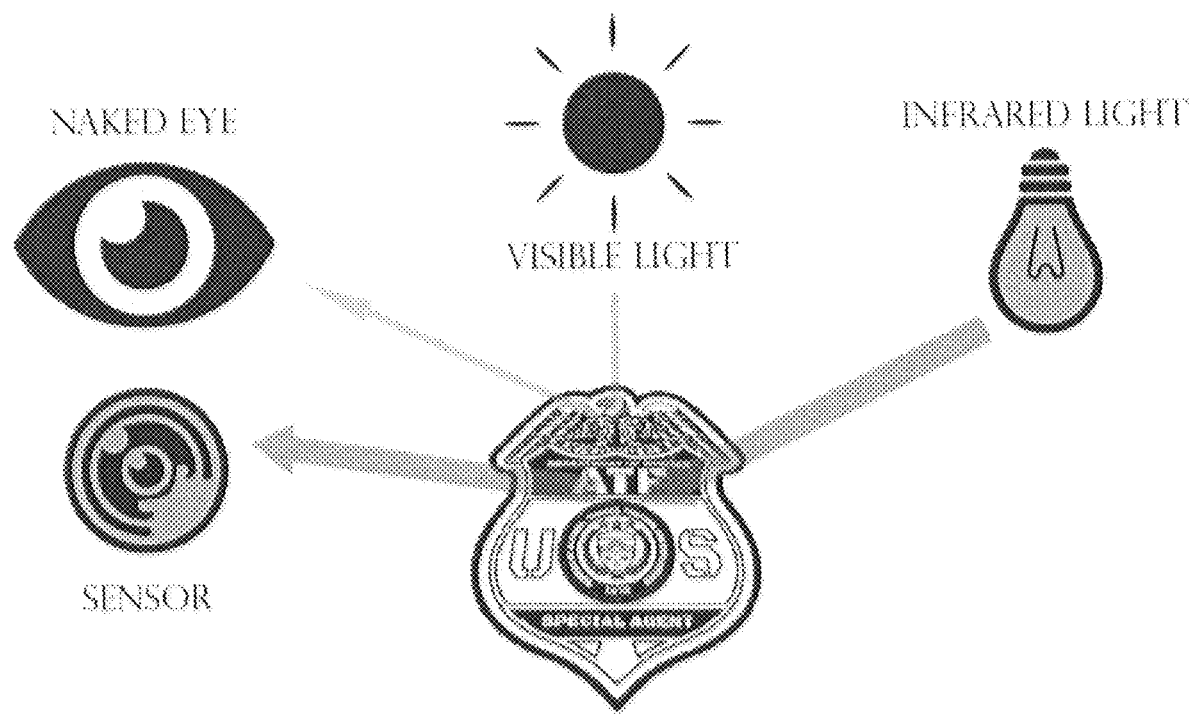
FIG. 3 is a perspective of an embodiment for visible light and IR light reflecting off the product with an enhanced, detailed, custom design.
Figure 4:
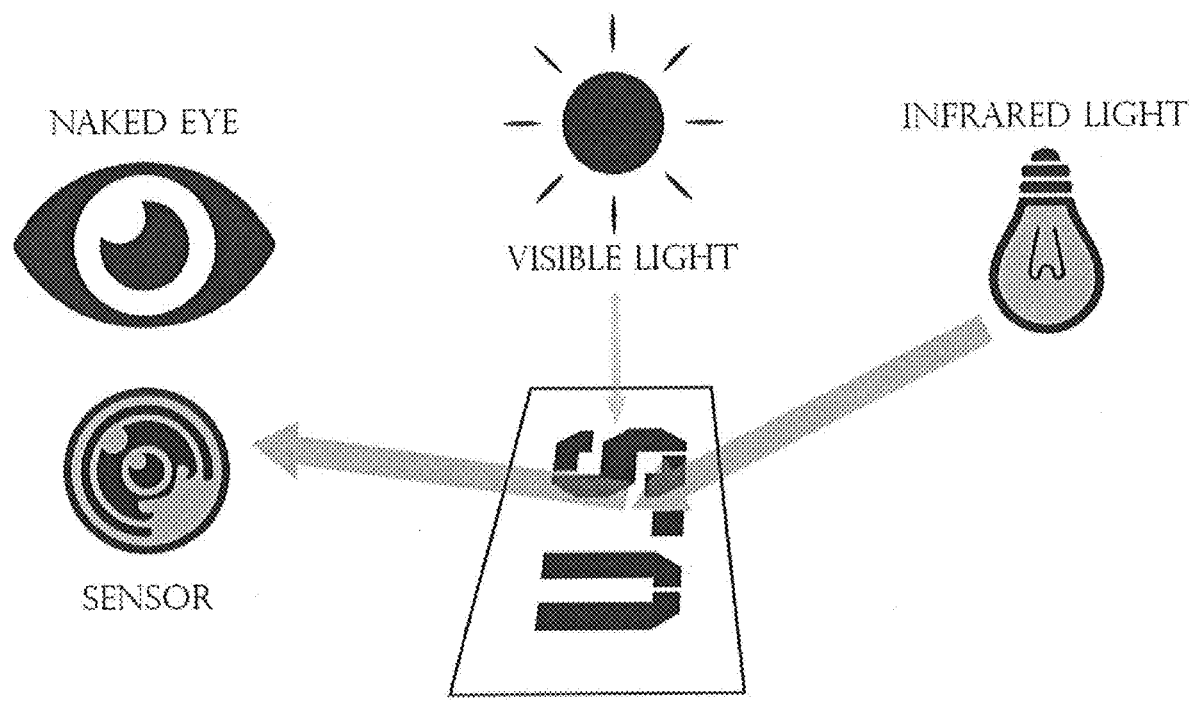
FIG. 4 is a perspective of an embodiment of IR reflecting only from the product as visible light is selectively reflected.
Figure 5:
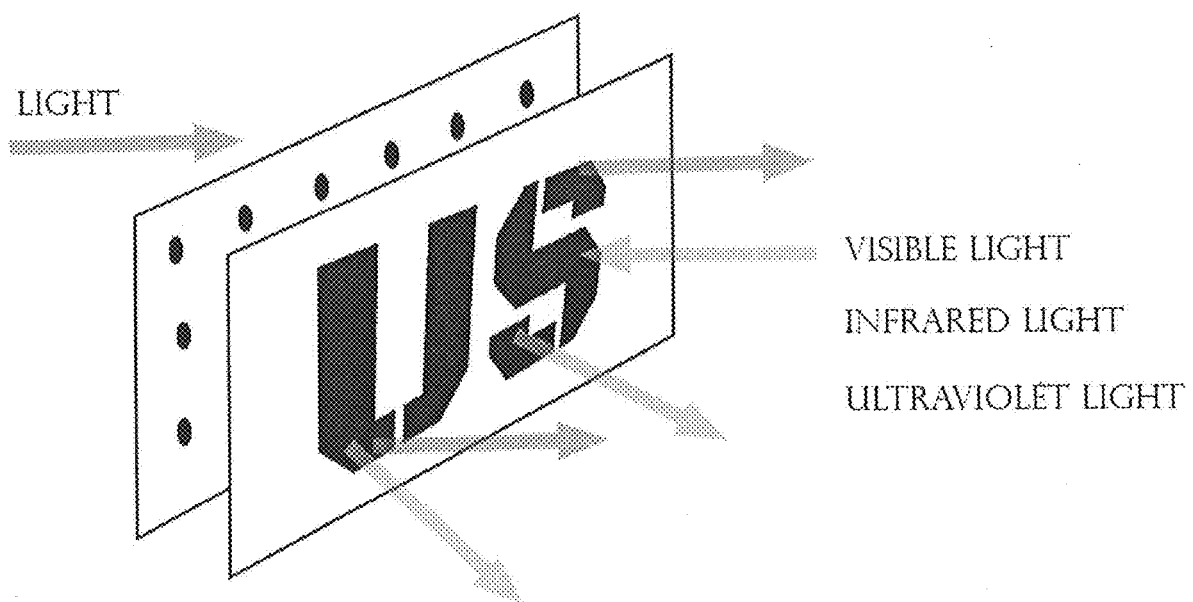
FIG. 5 is a perspective of an embodiment of light transmitting through the product from the reverse side, while the product is reflecting light from all spectrums from the exposed side.
Figure 6:
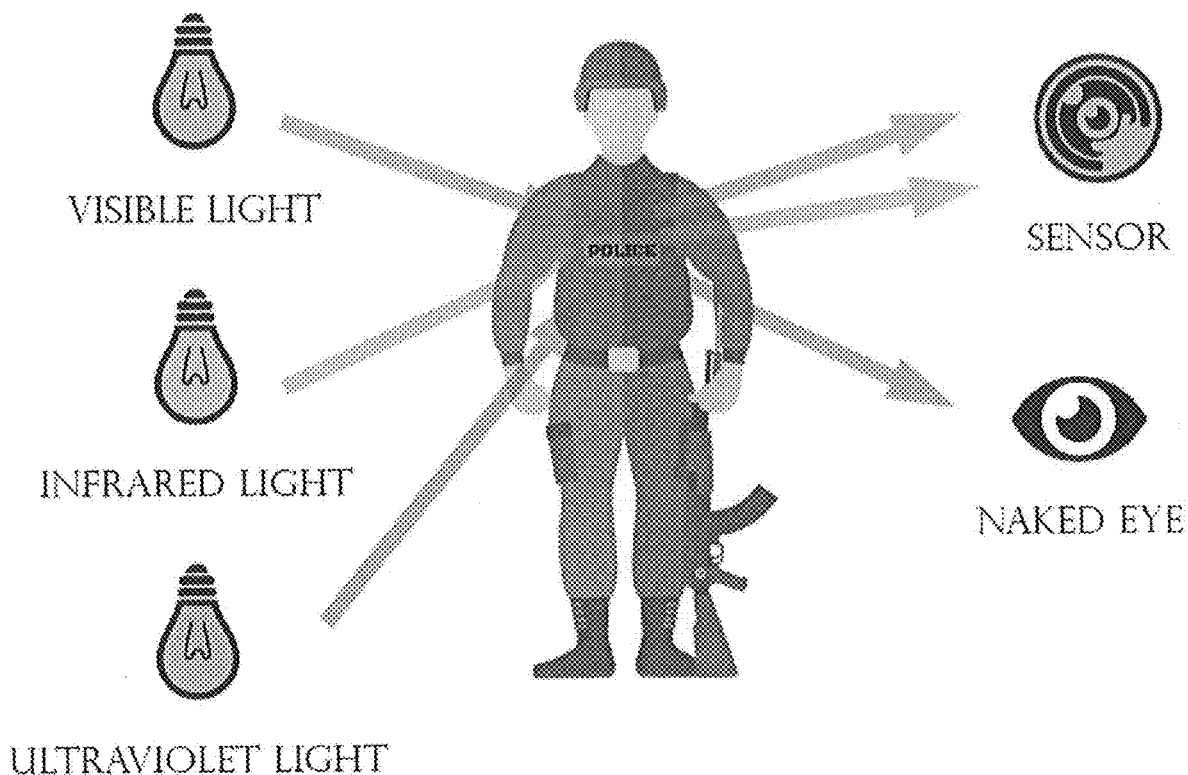
FIG. 6 is a perspective of an embodiment of the identification system in use on a law enforcement officer with varying light sources and means of detection.

Referring to FIGS. 1-6, the various embodiments of the present disclosure are truly dependent upon the particular choice of the multitude of uses in which this system may be used by those specifically tailoring it to their needs.

The present teachings may be used in the technical field of military and law enforcement uniform accessories. In particular, the present teachings may be used to provide advanced multi-layer identification badges and patches for military and law enforcement personnel. For instance, modular patches according to the present disclosure can be worn on the uniforms of military or law enforcement operational personnel to increase visibility of these individuals in various light conditions with identification features that can be seen by the naked eye (the general public) or markers visible to specific to sensors in possession of other operational personnel to identify friend from foe.

In at least one embodiment, a PVC-RR-ID system, also known as a modular PVC infrared (Mod-PVC-IR) system, is composed of flexible PVC plastisol combined with retroreflective sheeting material that is sewn to a hook and loop fastener backing. The final result is modular patches that can be worn on the uniforms of military or law enforcement operational personnel to increase visibility of these individuals in various light conditions.

There are multiple variants or embodiments included in the present teachings, including the following: (1) High-visibility: High-Visibility Mod-PVC-IR allows for the wearer to be identifiable in low light conditions. It is highly visible and highly reflective in both normal light and when subjected to infrared light (night vision). (2) Covert: Covert Mod-PVC-IR allows for the wearer to be identifiable under infrared light only, and is only low to semi reflective in regular light. (3) Low light back-lit modular PVC. An additional embodiment of the present invention includes the use of an interchangeable chemiluminescent backing layer, a light-emitting diode (LED), or other lighting method. This light emission from this layer is able to permeate the retroreflective sheeting and illuminate the desired area even when there is no external light source as would be required for a reflective only material. The ability to pass light through the reverse side of the retroreflective material, in combination with the addition of a self-contained light source, allows the product to retain luminescence, even in the absence of radiant light or an outside light source. Additionally, the modular PVC can have selective filtration qualities for wavelength-specific selective filtration of light transference or reflection. (4) Lastly, due to their modular design, it requires little modification to add existing identification technologies, either as a peripheral component or a rear layer. These technologies currently include global position satellite (GPS) information, radio frequency identification (RFID), Bluetooth, but could easily accommodate future technologies.

PVC-RR-ID systems solve several problems that exist with the current available options. First, PVC-RR-ID systems can be made to allow the wearer to be identified in multiple types of light, rather than just one or the other (i.e., high visibility in both normal visible light and light in the infrared spectrum), and the PVC protective layer has a much greater degree of durability in all weather conditions. Secondly, as opposed to traditional embroidered uniform markers, PVC offers the ability to have enhanced design detail, which is useful for both the military and law enforcement communities where the positive identification of operational personnel is a major safety concern. Lastly, PVC-RR-ID systems are a platform that can be equipped with additional features that allow for even greater utility for the user.

The identification of friendly forces is vastly important for operational personnel in both the military and law enforcement communities. While reflective gear and equipment is widely used in both sectors, uniform markings are severely lacking with respect to modern technological development. Both communities benefit greatly from a product or device that can be worn on the uniform allowing for the user to be identified by light in multiple forms and wavelengths. Without the addition of optional features, the base product, when worn on the uniform, assists the user by allowing the user to be seen under low light/ no light conditions. PVC-RR-ID systems greatly increase officer/military safety, because it is easier to see personnel in ambient light with or without the use of special night vision equipment. The ability to customize the face (front) of the product with greater detail than that of embroidered counterparts helps the public identify, in clearer definition and a high degree of reflectivity, safety personnel in emergency situations, and public safety officials in routine traffic situations.

In some embodiments, modular PVC-RR-ID systems are uniform articles enabling the wearer to be identified in different light conditions. The base system is composed of multiple layers including: (1) PVC component for flexible protection, and detailed design; (2) retroreflective sheeting; (3) filter (optional); (4) modular component (hook and loop fasteners or other types of fasteners, e.g., embroidery, buttons, molle system, adhesives, etc.). The base system can be modified to incorporate a light source behind the retroreflective sheeting that enhances the visibility of the sheeting when outside light is unavailable using chemiluminescence or a battery-powered LED component.

Individual components are manufactured separately and combined. Flexible PVC can be derived by use of PVC polymers with a liquid plasticizer, stabilizer, and dye. The resultant is then poured into a custom aluminum mold whose design complements the military/law enforcement uniform to which it will be affixed. Retroreflective sheeting can be printed or woven using several manufacturing methods, and various light filters are available that can be added as necessary to produce a light-specific reflective final product.

A hook and loop fastener, or equivalent, is then sewn on the back of the system in order to allow the wearer to choose the location for the systems that best fits the wearer's individual needs. The addition of a light source behind the retroreflective material is an optional step that can be taken to choose the location for the systems that best fits the wearer's individual needs. The addition of a light source behind the retroreflective material is an optional step that can be taken to increase the utility of the system in low-light/no light conditions. This light source can either be chemiluminescent or battery-powered. Once all modular components are selected, the final product can be embroidered or heat-pressed together, creating the final multilayer system.

There are multiple disadvantages to existing technologies available to law enforcement and military personnel. For example, traditional reflective markers available on the market for the identification of friendly forces allow for the detection of one type of light only (e.g., infrared reflective patches or reflective traffic vests). Additionally, infrared reflective patches worn by military members across the world are either frail and exposed to the elements, or are protected by a layer of embroidered fabric. Both of which fall apart, fade, and lose utility over short periods of use under combat conditions.

Advantages of the modular embodiments described herein may include (but are not exclusive to) (a) Increase the utility of the system in low-light/no light conditions. This light source can either be chemiluminescent or battery-powered. (b) Once all components are available, the final product can be embroidered or heat-pressed together, creating the final multilayer system. (c) The PVC Plastisol material is superior to traditionally utilized embroidered patches because it is longer lasting and less resistant to wear and tear than its embroidered counterpart. (d) The retroreflective sheeting material is superior to traditional infrared reflective material because, as a system, it has the additional feature of high-visibility reflectivity under normal light conditions.

These units, when combined and sold as a system, optimize the safety of operational personnel under various conditions, and allows them to use the patch that best meets their needs.

Modular PVC retroreflective patches can be used to identify friendly forces or targets in various light conditions. Capable of reflecting light in the ultraviolet, infrared, and visible spectrums, and possessing enhanced durability, these patches have a multitude of uses in the military and law enforcement sectors.

In certain embodiments of the present disclosure, a modular identification system comprises a protective layer, a filter layer, and a reflective layer. The protective layer may be composed of polyvinyl chloride. The reflective layer may be composed of a retroreflective material. In these embodiments, the filter layer is ideally positioned between, and directly adjacent to, the protective layer and reflective layer. Each layer may be secured to any adjacent layers. In some embodiments, the protective layer may include an identification feature wherein said identification feature is defined by negative space formed in said protective layer which may itself be substantially opaque. For example, the word "POLICE" may be formed in said protective layer such that light may reflect off the reflective layer through the protective layer via the negative space corresponding to each of the letters. Of course, other words, symbols, or images could be similarly utilized as an identification feature.

Other embodiments of the present disclosure have at least one of a high-visibility mode, a covert mode, or a low light/back-lit mode. These embodiments allow for greater safety and identification customized for the environment and circumstances in which an embodiment is being used. As depicted in FIG. 1, these embodiments can further comprise a filter layer in addition to the layers described above. The filter layer may be composed of any material configured for selective, wavelength-specific filtration of light that can allow at least one range of wavelengths along the electromagnetic spectrum to pass, or otherwise filter through, the filter layer. In short, wavelength-specific selective filtration of light transference or reflection is provided by these embodiments of a modular PVC identification system of the present disclosure.

An embodiment including a high-visibility mode allows identification in low light conditions. The filter layer is configured to allow for high visibility and high levels of reflection in both normal light and when subjected to infrared light (night vision).

An embodiment including a covert mode allows identification under infrared light only. The filter layer in such an embodiment is configured to allow infrared light to pass through the filter layer such that the system is only semi-reflective in regular light.

An embodiment including a low light/back-lit mode includes the use of an interchangeable chemiluminescent backing layer, or a light emitting diode (LED) or other lighting method that is battery-powered. This backing layer is positioned adjacent, and secured, to the reflective layer on the side opposite the filter layer. Furthermore, the reflective layer is composed of a retroreflective material further configured to allow light emission from the backing layer to permeate the reflective layer, illuminating the desired area even with no external light source, as would be required for a reflective-only material. This ability to pass light through the reverse side of the retroreflective material, in combination with the addition of the LED or other self-contained light source, allows the product to retain luminescence, even in the absence of radiant light or an outside light source.

Another embodiment, due to the modular design, provides for existing identification technologies to be added as a peripheral component or rear layer, including but not limited to: global position satellite (GPS), radio frequency identification (RFID), or Bluetooth. Different future technologies are easily accommodating into this system design. In such embodiments, this rear layer would be positioned adjacent, and secured, to reflective layer on the side opposite the filter layer. In embodiments which include a backing layer, the rear layer may be positioned adjacent, and secured, to the backing layer on a side opposite the reflective layer.

A further embodiment provides for the use of different mountable attachment means for attaching, or otherwise securing (such as hooks and loop fasteners, embroidery, buttons, modular lightweight load-carrying equipment ("MOLLE") systems, adhesives. or other functional equivalents), the modular identification system to various materials as best suited for the particular need.

Although the disclosure has been described with reference to specific embodiments, this description is not meant to be construed in a limited sense. Various modifications of the disclosed embodiments, as well as alternative embodiments of the disclosures will become apparent to persons skilled in the art upon the reference to the description of the disclosure. It is, therefore, contemplated that the appended claims will cover such modifications that fall within the scope of the disclosure.

The invention claimed is:

1. A multi-layer identification patch, comprising:
a reflective background layer comprising a front side to face away from a garment when the multi-layer identification patch is affixed to the garment; and
a mask layer secured over the front side of the reflective background layer;
wherein the mask layer comprises (a) an opaque layer of flexible polyvinyl chloride (PVC) and (b) a void in the opaque layer of flexible PVC;
wherein the void has a shape that forms an identification symbol; and
wherein the opaque layer of flexible PVC is secured over a first portion of the reflective background layer, thereby fixing the void that forms the identification symbol over a second portion of the reflective background layer, and thereby enabling the second portion of the reflective background layer to reflect light through the void in the shape of the identification symbol.

2. The multi-layer identification patch of claim 1, wherein the mask layer comprises multiple voids that have respective shapes that form respective identification symbols.

3. The multi-layer identification patch of claim 1, wherein the mask layer comprises a single monolithic layer of flexible PVC that comprises the void in the shape of the identification symbol.

4. The multi-layer identification patch of claim 3 wherein the mask layer has been heat sealed over the front side of the reflective background layer.

5. The multi-layer identification patch of claim 1, wherein the reflective background layer comprises a retroreflective material.

6. The multi-layer identification patch of claim 1, further comprising:
a filter layer between the reflective background layer and the mask layer, wherein the filter layer allows infrared light to pass through the filter layer, and the filter layer prevents visible light from passing through the filter layer.

7. The multi-layer identification patch of claim 1, further comprising:
   an attachment layer secured under the reflective background layer, wherein the attachment layer comprises at least one side of a hook and loop fastener.

8. A multi-layer identification patch, comprising:
   a reflective background layer comprising a front side to face away from a garment when the multi-layer identification patch is affixed to the garment; and
   a mask layer secured over the front side of the reflective background layer;
   wherein the mask layer comprises (a) an opaque layer of flexible polyvinyl chloride (PVC) and (b) a void in the opaque layer of flexible PVC;
   wherein the void has a shape that forms an identification symbol;
   wherein the opaque layer of flexible PVC is secured over a first portion of the reflective background layer, thereby fixing the void that forms the identification symbol over a second portion of the reflective background layer, and thereby enabling the second portion of the reflective background layer to reflect light through the void in the shape of the identification symbol; and
   wherein the multi-layer identification patch further comprises a backing layer secured under the reflective background layer, wherein the backing layer comprises an internal light source, and wherein the reflective background layer allows light from the internal light source to pass through the reflective background layer.

9. The multi-layer identification patch of claim 8, wherein the internal light source comprises at least one light-emitting diode (LED).

10. The multi-layer identification patch of claim 8, wherein the internal light source comprises a chemiluminescent material.

* * * * *